United States Patent [19]

Pedersen

[11] Patent Number: 4,864,152
[45] Date of Patent: Sep. 5, 1989

[54] FLOATING TIDAL POWER STATION FOR PLACING IN SEA AND RIVER CURRENTS FOR GAINING ENERGY

[76] Inventor: Hans M. Pedersen, Laerkevej 4, Systofte, Nykobing F, Denmark-4800

[21] Appl. No.: 228,917
[22] PCT Filed: Nov. 30, 1987
[86] PCT No.: PCT/DK87/00148
  § 371 Date: Aug. 1, 1988
  § 102(e) Date: Aug. 1, 1988
[87] PCT Pub. No.: WO88/04362
  PCT Pub. Date: Jun. 16, 1988

[30] Foreign Application Priority Data

Dec. 3, 1986 [DK] Denmark ............................. 5827/86
Jun. 25, 1987 [DK] Denmark ............................. 3240/87

[51] Int. Cl.[4] ............................................. F03R 13/10
[52] U.S. Cl. ..................................... 290/53; 290/42
[58] Field of Search .................. 290/53, 42, 54, 43; 415/7, 85

[56] References Cited

U.S. PATENT DOCUMENTS 3,986,787 10/1976 Mouton et al. .................. 415/7
4,301,377 11/1981 Rydz ............................. 290/54 X
4,495,424 1/1985 Jost .............................. 290/53
4,511,808 4/1985 Jost .............................. 290/54
4,516,033 5/1985 Olson .......................... 290/55 X

FOREIGN PATENT DOCUMENTS 119352 4/1901 Fed. Rep. of Germany .
2648318 4/1978 Fed. Rep. of Germany .
55-1445 1/1980 Japan .

Primary Examiner—William M. Shoop, Jr.
Assistant Examiner—Sharon D. Logan
Attorney, Agent, or Firm—Merchant, Gould, Smith, Edell, Welter & Schmidt

[57] ABSTRACT

Floating water current power station comprising a ring-shaped pontoon (3) which by means of a mooring bitt (5) is anchored to anchors (1). All turbines (21) are detachably arranged on a common beam (11) and can as a unit be swung up to the surface within the area limited by the ring pontoon (3). The power station may swing around the bitt (5) the upper end of which is connected to a front pontoon (9) and a lower end (6) of which is secured to the anchors and which is moreover provided with tension distributing warps (16) to the turbine beam (11) and warps (7) to the same pontoon side as the one to which the bitt is secured.

8 Claims, 4 Drawing Sheets

FLOATING TIDAL POWER STATION FOR PLACING IN SEA AND RIVER CURRENTS FOR GAINING ENERGY

The invention relates to a floating tidal power station for placing in sea and river currents for gaining energy.

BACKGROUND

There are known various types of power stations utilising sea currents, river currents and tides by applying turbines placed in the water current. Utilisation of the energy in flowing sea or river water or in tides requires a power station which is arranged in such a manner that it will automatically adapt itself to the changing direction and speed of the water current and which will moreover operate satisfactorily even if there are great variations in the depth of water due to the tide and weather conditions in general. Furthermore, the station should be dependent on the depth of water so that it may find use within a depth range of 6 meters to 4 kilometers.

It is the object of the invention to provide such a floating power station affording a very substantial energy take-up and which will always adapt itself to the water flow and to the turn of the tide and which is designed in such a manner that it is particularly simple to maintain and repair.

This is achieved by designing the tidal power station according to the invention as disclosed. By inspection, repair work or replacement of one or more of the turbines, the entire turbine formation is pulled up into the water surface within the area limited by the ring pontoon where the waves are substantially calmed by the ring pontoon which for example obviates the need for awaiting calm weather before doing repair work. Furthermore, the ring pontoon surrounding all the turbines offers favourable working conditions so that it is not necessary to sail an auxiliary vessel or a barge crane out to the power station in order to be capable of commencing repair work or inspection.

Optimum utilisation of the ring pontoon is achieved by designing the power station according to the invention as disclosed in the dependent claims. It is possible to mount a great number of turbine units in the power station thereby providing a substantial power take-up and so running the station profitably. The shape of the ring pontoon means that the rear part may serve as a suspension for the turbine formation which is almost weightless in the water; the front part serves as a mooring part and the sides serve to be capable of supporting the swung up turbine formation during towing and servicing.

To ensure that the ring pontoon is correctly positioned in the water so that the propeller plane of the turbines is always at right angles to the direction of the water current the power station according to the invention is preferably designed as disclosed in the dependent claims. It is thus possible to have an anchor point far below the water level and all forces directly to the anchor point around which the entire power station may swing. The result is that the ring pontoon will not take a lopsided position in the water even by a very substantial energy take-up in a strong water current such as a tidal current between high and low tide. The power cable is carried down through the bitt from slipring contacts at the top. When connecting and disconnecting the wire assembly means, a wedge arrangement retaining the wire assembly means may be manoeuvred from inside the mooring bitt.

Additional stability towards powerful changes in current etc. is achieved by designing the power station according to the invention in the dependent claims. In this manner all tractive forces are transmitted to the anchor warp without problems and the power station will always rest quietly and stably with the ring pontoon planely in the water surface.

By designing the securing of the internal warps as disclosed in the dependent claims, a simple way of mooring the power station to the mooring bitt is obtained.

By designing the power station according to the invention as disclosed in the dependent claims, it is possible in a simple manner to place the entire turbine formation in a position permitting service and repair work to be done and back again in its operational position using quite simple means. It is possible to carry out all these operations from the power station without any help from auxiliary vessels, barge cranes etc. and without any significant change of the stability of the floating power station.

By designing the power station according to the invention as disclosed in the dependent claims, it is possible to achieve an arrangement of the turbines on the central beam which is correct relative to power and moment. Connection and disconnection of the turbines powerwise should take place in pairs but purely physical replacement of for example a damaged turbine may without problems take place separately.

Preferably the power station according to the invention is designed as disclosed in the dependent claims. It is thereby possible to locate all auxiliary equipment and service equipment on and inside the ring pontoon. It is possible to carry out any form of repair work or maintenance on site without any outside help. The inside of the ring pontoon serves as a housing and as a transport route for installations and equipment. The purpose of the crane is to lift and mount the internal ring assembly of the anchor warps over the mooring bitt and to service and replace the turbine units which are almost weightless in the water, and moreover to operate as lifting gear for spares and other appliances.

BRIEF DESCRIPTION OF THE DRAWINGS

The invention will now be further explained with reference to the drawing showing a preferred embodiment of the invention wherein FIG. 5 is a detailed view of the wire connecting means at the lower end of the mooring bitt.

DETAILED DESCRIPTION

Figure 1:
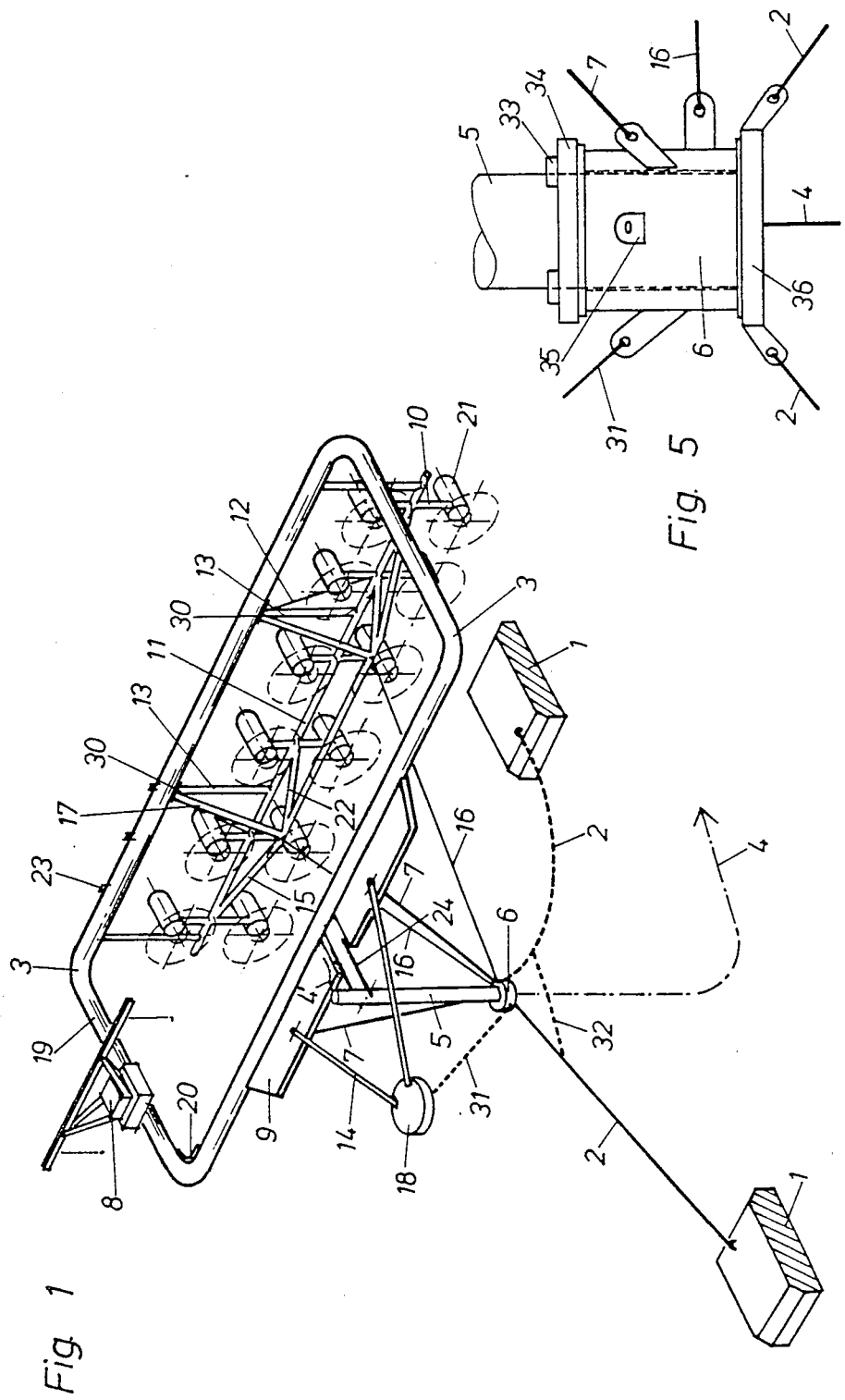
FIG. 1 is an inclined top view of the aggregate hydroelectric power station and in its operational position when producing electricity.

The drawing shows the floating power station anchored to two anchors 1 which are preferably aligned parallelly to the main direction of the current so that in general only one of the anchors will hold the power station up against the current.

The anchor warps 2 are connected to a mooring bitt or upright buoy 5 containing air chambers for buoyancy. Between the warps 2 there is provided an auxiliiary warp 32 preventing the slack warp from hitting the turbines due to the action of the current. At its lower end on a level with the turbine beam 11 the bitt 5 has a wire connecting link 6 with a nylon journal bearing so as to permit the entire power station to swing around the bitt 5 and as will be further explained in connection with FIG. 5.

The power station comprises a rectangular ring-shaped floating pontoon 3 which via a front pontoon 9 and an anchoring means 24 is anchored to the bitt 5. In front of the bitt 5 there may be arranged an independently floating buoyancy pontoon 18 which by solid struts 14 is secured to the front pontoon 9 on either side of the bitt 5. A steel wire 31 extends from the buoyancy pontoon 18 to the connecting link 6 from which steel wires 7 as strapping warps extend to the ring pontoon 3 and from which further steel wires 16 as tension distributing warps extend to the central beam 11 in the turbine formation.

The turbine formation itself comprises a number of preferably uniform water power turbines or propeller driven generators 21 which by means of turbine guides 10 are arranged for example in pairs on either side of a common central and hollow beam 11. The beam 11 is suspended in upright columns 13 which by means of hinges 30 are suspended in the long side of the ring pontoon 3 situated opposite the mooring side.

For securing and for relieving pressure on the turbine beam there is moreover provided a main beam 15 in a common turbine lattice beam, transverse struts 12, for example in the form of steel wires, lattice diagonals 22 and inclined columns 17.

Figure 2:
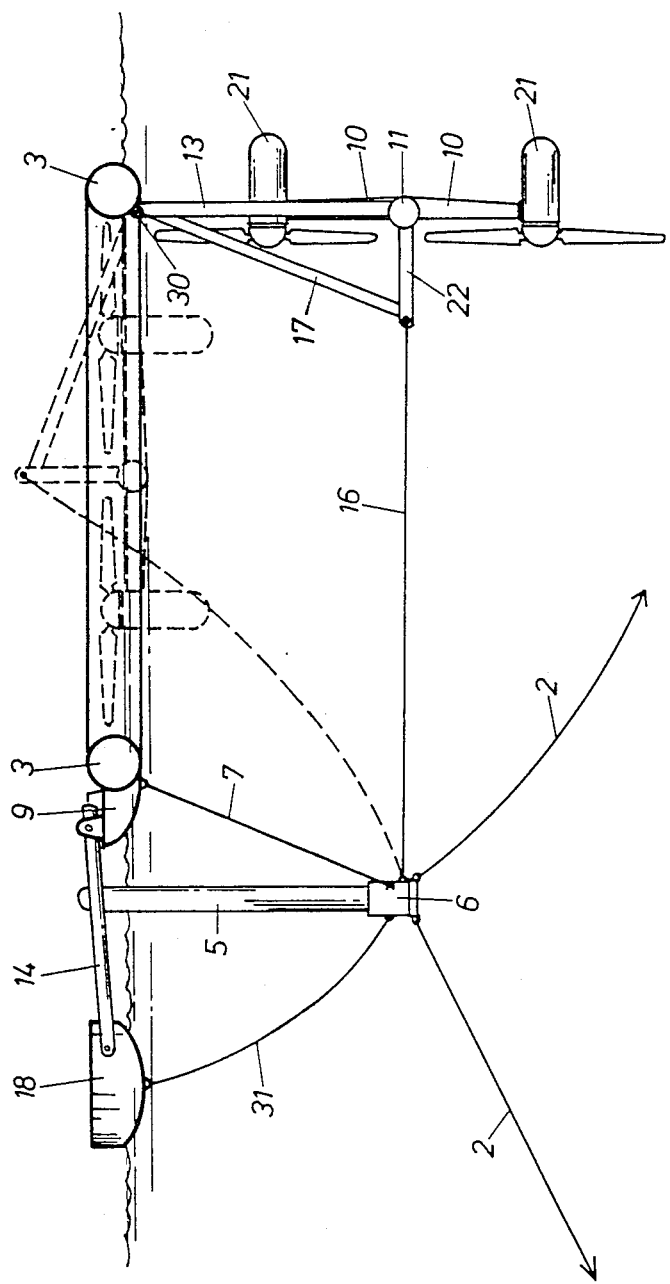
FIG. 2 is a vertical plane section of the power station along the line II—II in FIG. 3.

FIG. 2 shows how the mechanical power is transferred directly from the central beam 11 via the tension distributing warps 16 to the anchor point 6 at the lower end of the bitt 5.

The ring pontoon 3 is furthermore provided with a crane track or rails 19 for a mobile crane 8, an inner circumferential catwalk 20 with fender and outer fenders and mooring means 23.

FIG. 1 shows how the power cable 4 extends down and out through the bottom of the bitt 5 at the top of which there may be designed sliding contacts or similar contact means so that the cable 4 between the bottom 36 of the mooring bitt and the power station is not twisted with the changes of current and other manoeuvring of the power station.

Figure 3:
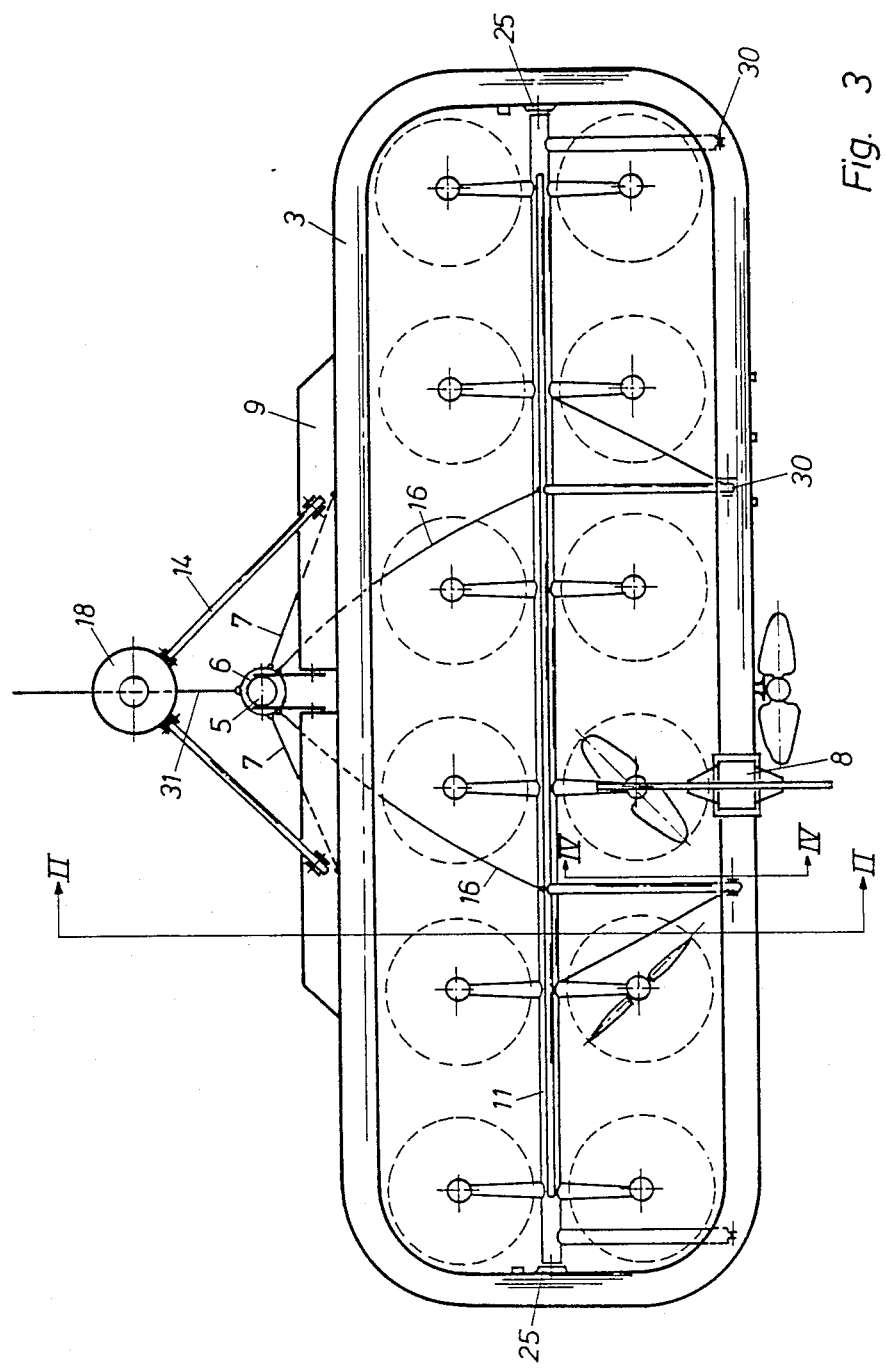
FIG. 3 is a top view of the power station and with the entire turbine formation in position for repairs and/or maintenance.

FIG. 1 shows the station in its normal position producing electricity on all turbines, in the shown example twelve turbines. In case of repair or maintenance work the entire turbine formation is swung up as shown by a broken line in FIG. 2 or by a solid line in FIG. 3. This maneuvering is performed by first feathering and stopping all propellers, then air is blown into buoyancy chambers in the beam 11 whereafter it is possible by pulling wires in a generally known manner to swing the turbine formation in its hinges 30 to the shown position whereupon the beam 11 is locked at both ends to the ring pontoon 3 by means of the locking means 25.

Figure 4:
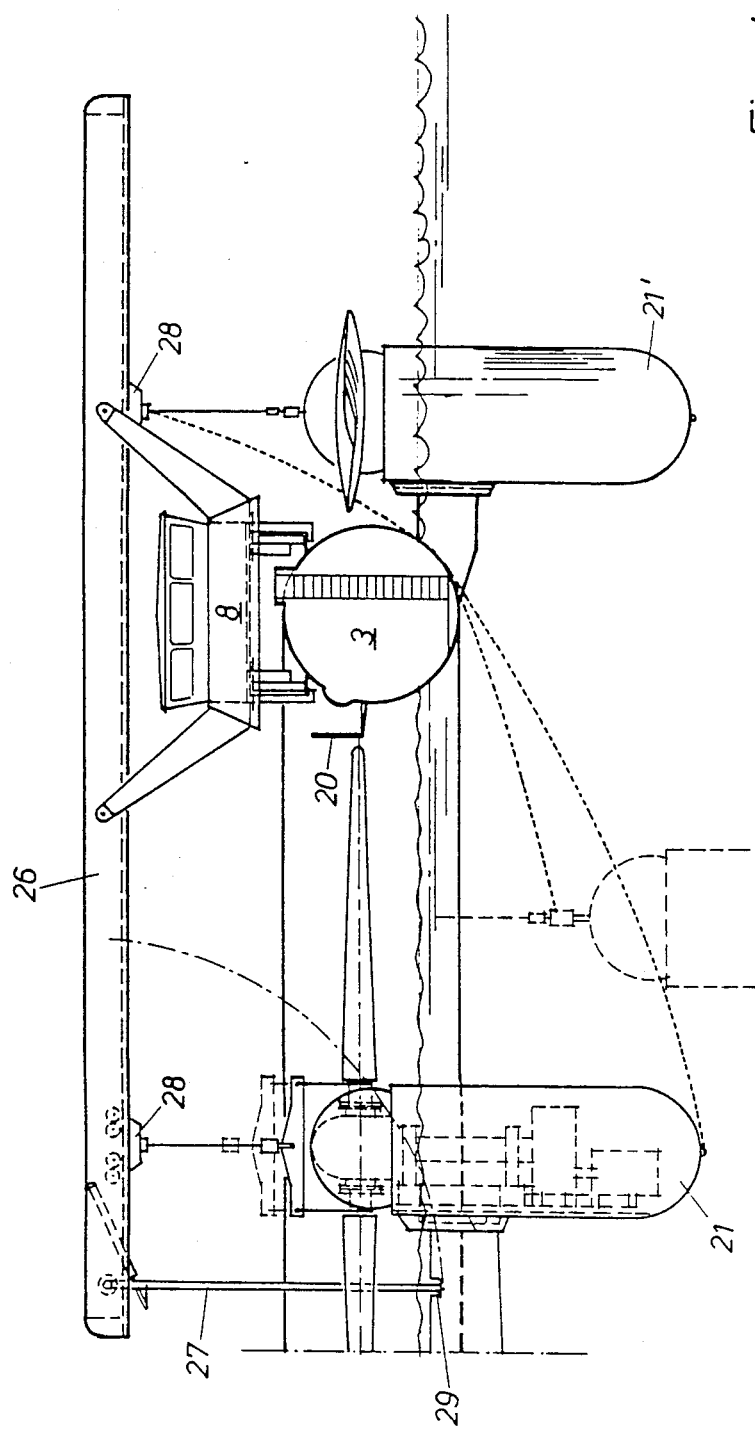
FIG. 4 is a partial section on a large scale along the line IV—IV in FIG. 3.

The detailed view in FIG. 4 shows the operation of the service crane 4 on the ring pontoon 3. The jib 26 of the crane has a supporting leg 27 which by means of a locking mechanism 29 may rest on the turbine guide 10 of the turbine to be repaired or replaced. It is then possible by means of the crane having two crabs 28 to replace the turbine 21 by the spare turbine 21'. Cable joints etc. from the turbine unit to the power station are disconnected and the turbine 21 is released and lifted a short distance by means of the crane. The top or the bottom of the unit 21 is connected to the crab on the jib 26 outside the ring pontoon and by slackening and lifting the unit 21 is carried outside the ring pontoon 3 in a movement down below the pontoon. The same operation is carried out with the spare turbine 21' but in reverse order when same is arranged in its place.

The mooring to and the connection of the internal warps to the mooring bitt 5 will now be further described in the following with reference to FIG. 5 of the drawing. The mooring bitt is provided with a ring-shaped bottom 36 to which the anchor warps 2 are secured. Before placing a power station in the water current, the anchors 1, the warps 2 and the hollow vertically floating bitt 5 are first arranged.

When a power station is to be towed out to the mooring bitt 5, this is done with the turbine formation in its lifted and locked position. All internal warps, i.e. the warps 7 and 16, are in beforehand secured to the cylindrical wire connecting means 6 which during the towing rests on the front pontoon 9. By means of the crane 8 the cylinder 6 is lifted e.g. by hooking on the vacant fitting 35. When the power station has been towed in place, the wire connecting means 6 is slid down over the bitt 5 until it rests on the bottom part 36 whereupon a solid steel ring 34 is lowered and locked to the bitt 5, e.g. by an extending wedge arrangement 33 which can be operated from within 5. The means 6 can now freely turn relative to the bitt 5 because there are arranged nylon journal bearings and discs between the means 6 and the bitt 5.

Then the fittings 24 are connected to the top of the bitt 5 together with the internal cable 4' and the entire floating power station is now anchored and connected in such a manner that it freely swings according to the direction of the water current.

By disconnecting the power station from the bitt 5 the above measures are taken in reverse order but not till the turbine formation has been swung up and secured to the locking means 25 and the cable connection 4' to the top of the bitt 5 has been disconnected.

A station according to the invention may for example have the following dimensions:

Anchors: Reinforced concrete caissons $30 \times 15 \times 7$ m, weight approx. 18,000 tons.

Ring pontoon: Diameter 4 m. External measurements: $50 \times 150$ m.

Turbines: 12 asynchronous generators of 740 kW each.

Propeller: Diameter 18 m.

Presupposing a tidal mean flow rate of 1.3–1.9 m/sec and an energy gain of 44% of the energy in the water current during working time, the station will be capable of supplying 33 mill. kWh/year. Depending on the water depth, the turbine formation may have one or two rows of turbines. By low current depths between 6–25 m one row of turbines will be most advantageous. The turbines shown on the drawing are upstream turbines but there is of course nothing to prevent the use of downstream turbines.

I claim:

1. Floating tidal power station for placing in sea or river currents for gaining energy by means of turbine generators submerged in the water current, comprising a ring-shaped pontoon floating on the surface of the water, said pontoon being anchored to the bottom and supporting a number of turbines which are all arranged in a common turbine formation under the pontoon, means for moving the turbine up to the surface within an area defined by the pontoon so that the turbine formation is limited in its upward movement by the ring pontoon.

2. Power station according to claim 1, characterised in that the ring pontoon is quadrangular, preferably rectangular, and moored in such a manner that it may freely swing in the water current but with its long sides transversely to the direction of the current.

3. Power station according to claim 2, characterised in that outside the ring pontoon (3) there is arranged a vertical mooring bitt (5), preferably with buoyancy chambers, having a cable entry the upper end of said bitt being secured by or above the water surface at the middle of one of the long sides of the ring pontoon and where the lower end (36) of the bitt (5) is secured to anchors (1) by means of anchor warps (2) and where from the same end with the connecting link (6) tension distributing warps (16) have been carried to the central parts (11) of the turbine formation and warps (7) have been carried to the same pontoon side as the one to which the bitt is secured.

4. Power station according to claim 3, characterised in that at the mooring side the ring pontoon (3) is provided with further buoyancy, preferably in the form of a front pontoon (9) forming an extension of the ring pontoon, and that to said front pontoon (9) and in front of the mooring bitt (5) there may be secured a further, independently floating buoyancy pontoon (18) which with struts (14) on either side of the bitt (5) is connected to the front pontoon (9) and where a wire (31) extends from the buoyancy pontoon (18) t o the connecting link (6) of the lower end of the bitt (5).

5. Power station according to claim 3, characterised in that the lower end of the bitt (5) comprises a cylindrical part (6) which may be slid down the bitt (5) and be pivotally retained at the lower end thereof, said cylindrical part comprising a number of fittings for securing the warps (7,16 and 31).

6. Power station according to claim 1, characterised in that the turbine formation comprises a central beam (11) supporting all turbines in at least one line and said turbines being mounted by means of turbine guides (10), said beam (11) comprising buoyancy chambers and locking means so that the beam may be locked to locking means (25) arranged on the short sides of the ring pontoon (3) in that the turbine formation is hinged (30) on the long side of the ring pontoon opposite the long side on which the mooring bitt (5) is secured.

7. Power station according to claim 1, characterised in that the turbines (21) are built up as units which placed in the water are substantially weightless and which may be arranged in pairs and on either side of the central beam (11) in that each unit is adapted to be removed and replaced separately.

8. Power station according to claim 1, characterised in that the ring pontoon (3) is a hollow steel plate structure which is adapted to hold auxiliary equipment such as compressors, compressed-air tanks, electrical equipment, salvage equipment etc. and that the upper side of the pontoon is provided with rails (19) or the like for a movable crane (8) having a jib (26) at right angles to t he pontoon (3).

* * * * *